US012140100B2

(12) United States Patent
Pfrommer et al.

(10) Patent No.: US 12,140,100 B2
(45) Date of Patent: Nov. 12, 2024

(54) CONTROLLING AN INTERNAL COMBUSTION ENGINE USING AN OPERATING PARAMETER MAP DERIVED FROM A TRAINABLE MODEL

(71) Applicant: FRAUNHOFER-GESELLSCHAFT ZUR FÖRDERUNG DER ANGEWANDTEN FORSCHUNG E.V., Munich (DE)

(72) Inventors: Julius Pfrommer, Karlsruhe (DE); Janina Stompe, Karlsruhe (DE); Johannes Sailer, Karlsruhe (DE)

(73) Assignee: Fraunhofer-Gesellschaft zur förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 18/252,104

(22) PCT Filed: Nov. 9, 2021

(86) PCT No.: PCT/EP2021/081088
§ 371 (c)(1),
(2) Date: May 8, 2023

(87) PCT Pub. No.: WO2022/101187
PCT Pub. Date: May 19, 2022

(65) Prior Publication Data

US 2024/0003308 A1 Jan. 4, 2024

(30) Foreign Application Priority Data

Nov. 12, 2020 (DE) ..................... 10 2020 129 903.6

(51) Int. Cl.
*F02D 41/14* (2006.01)
*F02D 41/24* (2006.01)

(52) U.S. Cl.
CPC ..... *F02D 41/1406* (2013.01); *F02D 41/2451* (2013.01); *F02D 41/2487* (2013.01); *F02D 2041/1437* (2013.01)

(58) Field of Classification Search
CPC ............. F02D 41/1406; F02D 41/2451; F02D 41/2487
See application file for complete search history.

(56) References Cited

U.S. PATENT DOCUMENTS 4,901,240 A 2/1990 Schmidt et al.
2003/0126859 A1 * 7/2003 Wachi .................. F01N 13/009 60/285

(Continued)

FOREIGN PATENT DOCUMENTS

DE 36 03 137 C2 6/1994
DE 102004026582 A1 12/2005

(Continued)

OTHER PUBLICATIONS

German Patent Office, Examination Report in German Patent Application No. 10 2020 129 903.6 (Apr. 26, 2021).

(Continued)

*Primary Examiner* — John Kwon
(74) *Attorney, Agent, or Firm* — Leydig, Voit & Mayer, Ltd.

(57) ABSTRACT

The invention relates to an engine control unit for an internal combustion engine of a vehicle, with a control unit which is designed to set one or more operating parameters of the internal combustion engine based on a predefined multidimensional operating parameter map which is stored in the control unit and specifies respective operating parameter values for various operating states of the internal combustion engine, wherein the control unit is designed to transmit an operating parameter history, which comprises operating parameter values set for the internal combustion engine in its (Continued)

operating history, to a learning unit, and to receive operating parameter map update data from the learning unit and to update the stored operating parameter map by means of the operating parameter map update data in order to provide improved control for the internal combustion engine.

16 Claims, 1 Drawing Sheet

(56) References Cited

U.S. PATENT DOCUMENTS

| | | | | |
|---|---|---|---|---|
| 2004/0133336 | A1 | 7/2004 | Fosseen | |
| 2010/0106355 | A1* | 4/2010 | Hattori | B60K 6/24 701/22 |
| 2011/0295491 | A1* | 12/2011 | Kurahashi | F02D 41/1454 701/103 |
| 2020/0049094 | A1 | 2/2020 | Charbonnel et al. | |
| 2021/0094588 | A1* | 4/2021 | Kim | G06F 18/2413 |
| 2021/0123757 | A1* | 4/2021 | Lee | G06N 3/02 |
| 2021/0403022 | A1* | 12/2021 | Hong | B60W 50/14 |
| 2023/0417199 | A1* | 12/2023 | Pfrommer | F02D 41/266 |

FOREIGN PATENT DOCUMENTS

| | | | |
|---|---|---|---|
| EP | 2 818 379 | A1 | 12/2014 |
| GB | 2 583 383 | A | 10/2020 |
| WO | WO 2021/178227 | A1 | 9/2021 |

OTHER PUBLICATIONS

European Patent Office, International Search Report in International Application No. PCT/EP2021/081088 (Feb. 24, 2022).

European Patent Office, Written Opinion in International Application No. PCT/EP2021/081088 (Feb. 24, 2022).

International Bureau of WIPO, International Preliminary Report on Patentability in International Application No. PCT/EP2021/081088 (May 16, 2023).

* cited by examiner

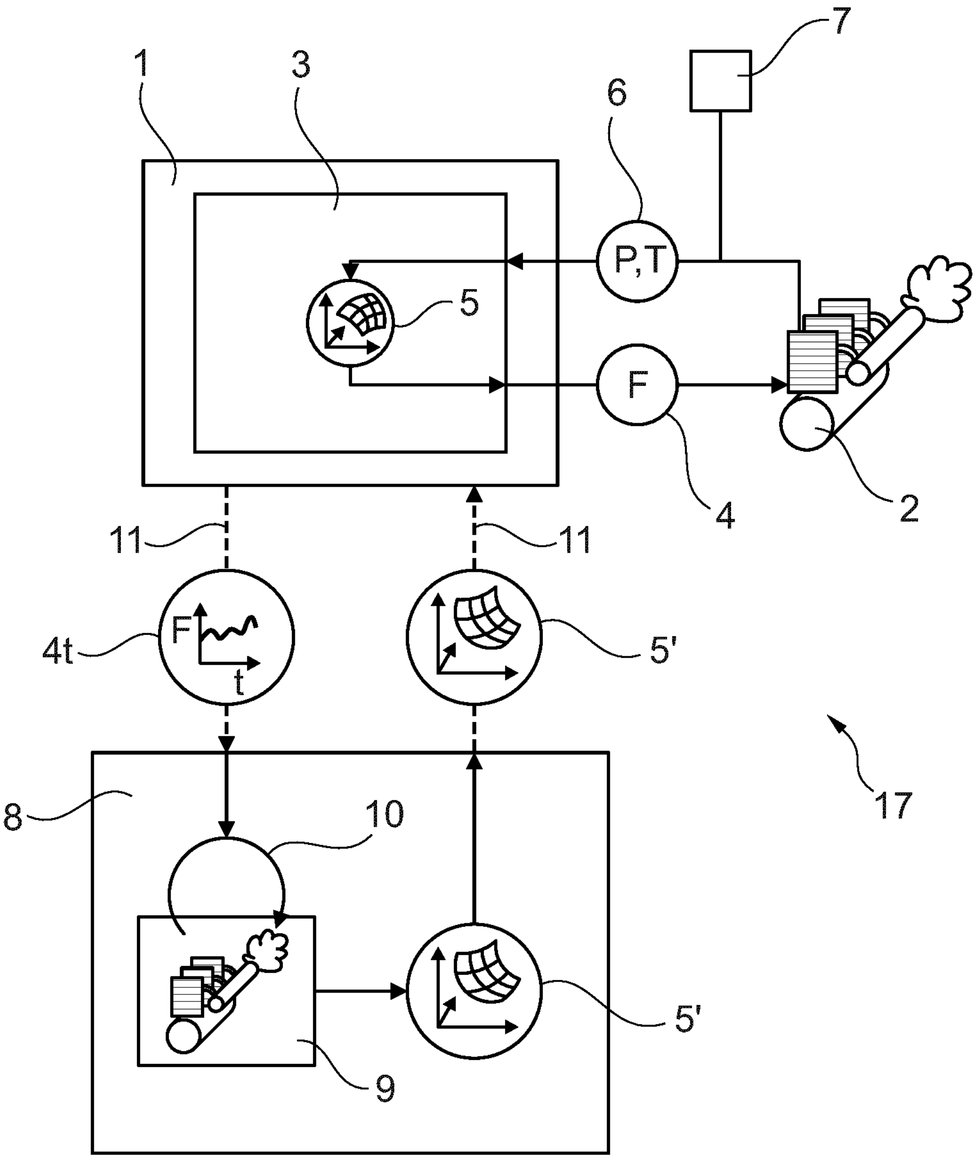
1
3
6
7
P,T
5
F
4
2
11
11
4t
F
t
5'
17
8
10
9
5'

CONTROLLING AN INTERNAL COMBUSTION ENGINE USING AN OPERATING PARAMETER MAP DERIVED FROM A TRAINABLE MODEL

CROSS-REFERENCE TO RELATED APPLICATIONS

This patent application is the U.S. national phase of International Application No. PCT/EP2021/081088, filed on Nov. 9, 2021, which claims the benefit of German Patent Application No. 10 2020 129 903.6, filed Nov. 12, 2020, the disclosures of which are incorporated herein by reference in their entireties for all purposes.

The invention relates to an engine control unit for an internal combustion engine of a vehicle, having a control unit which is designed to set one or more operating parameters of the internal combustion engine, based on a predefined multidimensional operating parameter map which is stored in the control unit and specifies respective operating parameter values for various operating states of the internal combustion engine.

Modern engine control units in internal combustion engines of vehicles control or regulate the internal combustion engine based on a control scheme. This control scheme, which may for example take the form of a high-dimensional map for the engine operating parameters (or, more generally, with such an operating parameter map), corresponds to a mathematical mapping of a number of input engine operating parameters, the measured variables, to a number of output engine operating parameters, the controlled variables.

The output motor operating parameter are typically output by the corresponding control unit of the engine control unit as a voltage, whereby both the level of the corresponding volt voltage and the time of application, the "timing", of the corresponding volt voltage determine the corresponding output motor operating parameter. Thus, for example, the amount of the corresponding voltage for a throttle valve position may encode a respective throttle valve angle as an output engine operating parameter. In contrast, the ignition timing is generally set as an output engine operating parameter via the timing of the corresponding voltage, i.e., the precise timing of a corresponding voltage peak in the associated control channel, wherein the timing may be predefined as a relative timing with respect to an operating cycle of the internal combustion engine, for example, with respect to a top dead center. The input engine operating parameters may be present both as (analog) voltages and also as an encoded digital signal, for example, as a data signal from corresponding sensors, or as data signal which contains values from a corresponding processor unit, calculated on the basis of corresponding sensor values. The control scheme, for example in the form of a multi-dimensional operating parameter map, then maps a higher-dimensional input motor operating parameter space of, for example, nine dimensions to a lower-dimensional output motor operating parameter space of, for example, three dimensions.

The ideal control scheme for an internal combustion engine generally also depends here on factors which are not explicitly considered in the control scheme. For example, fuel quality, air pressure, humidity, ambient temperature, or other environmental parameters, which may vary during operation of the internal combustion engine and are often unpredictable when configuring the engine control unit, also change a behavior of the internal combustion engine. In practice, a universal control scheme is correspondingly stored in the engine control units, which provides stable acceptable results with respect to, for example, torque response, fuel consumption or exhaust gas composition of the internal combustion engine, for different environmental parameters, i.e., different varying values of one or more environmental parameters. A torque response here describes the curve of an actual torque of the internal combustion engine provided in response to a requested target torque.

The first prerequisite for achieving an improved engine control for internal combustion engines in real conditions is described in US 2004/133 336 A1, in which a vehicle's combustion performance is remotely identified, in order to enable remote monitoring of vehicle performance.

It is correspondingly an object of the present invention to provide an improved control for an internal combustion engine, which enables real environmental conditions of the internal combustion engine to be better considered during control of the same.

This problem is solved by the subject matter of the present invention disclosed herein. Advantageous embodiments are also disclosed herein.

One aspect relates to an engine control unit for an internal combustion engine of a vehicle, in particular a propulsion internal combustion engine of a vehicle. This engine control unit has a control unit which is designed to set one or more operating parameters of the internal combustion engine, based on a predefined multidimensional operating parameter map which is stored in the control unit and specifies respective operating parameter values for different operating states of the internal combustion engine. In particular, the operating parameter map can be designed for an at least four-dimensional or an at least six-dimensional input motor operating parameter space. The operating states of the internal combustion engine can be represented by input engine operating parameters, which are provided to or queried by the engine control unit. The operating parameters of the internal combustion engine that can be set by the engine control unit can be referred to accordingly as output engine operating parameters. The multi-dimensional operating parameter map thus forms a mathematical mapping of the input motor operating parameters to the output motor operating parameters and thus realizes a control response of the engine control unit as a control scheme. The setting here can accordingly comprise a control and/or a regulation.

The control unit is designed to transmit an operating parameter history, which comprises operating parameter values set for the internal combustion engine in its operating history, preferably with a time stamp and/or correlated with the operating states of the internal combustion engine, to a learning unit. Accordingly, the control unit is also designed to receive operating parameter map update data from the learning unit and to update the stored operating parameter map by means of the operating parameter map update data.

This has the advantage that a flexible control of the internal combustion engine can be realized, in which the control unit can adapt to changed conditions, which do not have to be known in advance, especially when designing the engine control unit. The fact that the learning unit is independent of the control unit means that the motor control can be adapted in a particularly flexible manner. Thus, with a learning unit integrated into the engine control unit, learning and thus updating can be implemented without much effort and without requirements for a data connection to the outside. This allows learning to take place particularly frequently or without delay. An external, in particular off-board learning unit, in turn has the advantage that a particularly large amount of computing capacity is available, so that even more complex learning processes can be completed quickly. The presented concept also allows combinations of local and remote learning unit, which can have the same features described below, but preferably use different learning algorithms.

The respective operating state or states of the internal combustion engine may be represented by operating state data or input engine operating parameters. In particular, these can include or be an engine rpm and/or a throttle valve position and/or a fuel injection amount and/or a residual combustion gas amount and/or an ignition timing and/or a valve opening time and valve closing timing and/or an engine temperature and/or an intake-side gas mixture pressure and/or a pressure in the combustion chamber and/or an exhaust-side gas mixture pressure and/or an engine torque and/or an engine mileage and/or a geographical position of the vehicle and/or an engine ambient air pressure and/or an engine ambient air humidity and/or an engine ambient temperature and/or a fuel quality and/or an internal combustion engine type designation and/or a vehicle type designation and/or a vehicle mass. The respective operating parameters, which are set by the control unit, can be represented by output motor operating parameters. These are or include, in particular, a throttle valve position and/or an injection fuel amount and/or an ignition timing and/or a valve opening timing and/or valve closing timing (a phase adjuster for the valves) and/or a turbocharger boost pressure. The operating parameters mentioned are particularly advantageous here.

In an advantageous embodiment, it is provided that the operating parameter history also comprises the operating states, i.e., for example, one or more input engine operating parameters, of the internal combustion engine, based on which the respective operating parameter values, i.e., in particular the output engine operating parameters, are set. In particular, the operating parameter history can also include a chronological sequence of the operating states of the internal combustion engine and the set operating parameter values corresponding to the respective operating states, i.e. the operating states of the internal combustion engine with the correlated set operating parameter values over a period of time. Preferably, the operating parameter history comprises all available operating states and/or all available set operating parameter values. The operating parameter history can thus comprise an "operating trace" of the internal combustion engine, from which the operation of the combustion engine can be reconstructed over the corresponding period of time or temporal duration. This has the advantage that the learning unit has a particularly accurate, ideally complete picture of the processes in the internal combustion engine and thus the operating parameter map can be optimized particularly effectively, in particular adapted to changing conditions.

In a further advantageous embodiment, it is provided that a simulation model of the internal combustion engine, i.e. of the combustion process in the combustion engine, and a target function for evaluating the behavior of the combustion engine, i.e. the combustion in the combustion engine, are stored in the learning unit. The simulation model can be trained, i.e. changed or updated, by means of a learning algorithm stored in the learning unit and activated by it. The learning unit is appropriately designed to train and thus update the simulation model based on the transmitted operating parameter history and the stored target function using the learning algorithm. Furthermore, the learning unit is designed to generate the operating parameter map update data using the updated simulation model. This can be done in particular by means of a new operating parameter map calculated under the condition of the updated simulation model, with the operating parameter map update data then being suitable for aligning the operating parameter map stored in the control unit with the new operating parameter map.

The simulation model can be a simulation model that combines physically known relationships with purely data-driven learned relationships, a so-called "semi-physical" simulation model. In such a simulation model, for example, thermodynamic relationships of energy, volume, pressure and temperature can be combined as a physical relationship with the propagation of the flame front during combustion learned by means of a neural network as a data-driven relationship.

Thus, the operating parameter values of the operating parameter history set and used under real conditions are used to complete the understanding, i.e. the simulation model, of the internal combustion engine and the knowledge gained is made available again in the form of the operating parameter map update data to test it, again under real conditions. Accordingly, the learning unit is also configured to provide the operating parameter map update data to the control unit for updating the operating parameter map stored in the control unit. The operating parameter map update data may comprise the new operating parameter map in whole or in part, or one or more update values quantifying respective change values "Δ" of corresponding entries in the stored operating parameter map in the control unit. This has the advantage that the behavior of the engine control unit can be continuously improved under real conditions, while at the same time minimizing any computing effort required in the control unit. The volume of data generated between the control unit and the learning unit can also be minimized by selecting the appropriate operating parameter map update data.

In particular, the learning unit is designed to perform the updating, the generation and the provision repeatedly, preferably in this order and/or iteratively, so that the simulation model in the learning unit and correspondingly the operating parameter map in the control unit adapt more and more to the internal combustion engine, i.e. the vehicle and its environment, overtime. In particular, the simulation model can be a semi-physical simulation model in which a basic physical model comprises parameters adjustable via the learning algorithm. The number of parameters can be very large, for example 1,000 or more or 2,000 or more parameters. Such a complex model can therefore be used advantageously in the scenario described, since the operating parameter history can contain a large number of data with high frequency, e.g. per ignition, so that even larger parameter quantities can be reliably learned, meaning that the engine control can be improved particularly effectively.

It can be provided that the target function evaluates the behavior of the internal combustion engine based on a predefined optimization parameter, which in particular comprises or is a torque response of the combustion engine and/or a fuel consumption and/or an exhaust gas composition of the combustion engine. The target function can thus serve a trade-off between different aspects such as "How close is the torque to the desired torque?" and/or "How high is the consumption?" and/or "How much emissions are being produced?" For example, the target function (torque response−desired torque)2+α*fuel consumption+β*exhaust gas composition) can be minimized, with α and β as weighting parameters. This has the advantage that the learning of the motor control, i.e. the learning process, can be guided by the optimization parameter. The optimization parameters described have proven to be particularly advantageous for effectively improving engine control under real conditions.

In a further advantageous embodiment, it is provided that the control unit is designed to transmit the operating parameter history and/or receive the operating parameter map update data only in a predefined time period and/or only in a predefined local area and/or only in a predefined operating state of the internal combustion engine, in particular only when the internal combustion engine is switched off and/or has an engine temperature that is below a specific value. This has the advantage that unwanted transmission or updating can be prevented and, for example, it can also be ensured that a connection to the learning unit is not interrupted unexpectedly. It can also be achieved in this way that the operating parameter history has a predefined minimum quantity with which particularly efficient learning is achieved.

A further aspect relates to an engine control system having an engine control unit according to one of the embodiments described, and having a learning unit arranged locally remote from the engine control unit in a server device, in particular a stationary server device. This has the advantage that the engine control unit requires only little computing capacity and, conversely, more complex learning algorithms can be used in the learning unit. Moreover, the learning unit can thus also be updated more easily, in particular the learning algorithm can be updated, so that in turn the motor control can be improved more effectively. This is also advantageous in that large leaps in knowledge are currently occurring in the field of learning algorithm research, so it is particularly desirable to be able to adapt the learning algorithm to the current state of development with little effort.

In an advantageous embodiment, it is provided that the transmission of the operating parameter history and/or the reception of the operating parameter map update data is performed via a wireless interface of the control unit and the learning unit, in particular a mobile radio interface such as LTE or 5G and/or a wireless local area network (WLAN) interface or a near-field radio interface such as Bluetooth or the like. This allows for particular flexibility and user-friendliness. It is particularly advantageous if the operating parameter map update data is adapted to wireless transmission in order to reduce the data volume, for example, only the above-mentioned change values are transmitted.

Further aspects relate to an internal combustion engine or vehicle having an engine control unit according to any of the described embodiments, or having an engine control unit of any of the described embodiments of engine control systems.

Another aspect relates to a method of operating an engine control unit of an internal combustion engine of a vehicle. One process step is the setting of one or more operating parameters of the internal combustion engine by a control unit, based on a predefined multidimensional operating parameter map which specifies respective operating parameter values for various operating states of the internal combustion engine. A further process step is the transmission of an operating parameter history, which comprises operating parameter values set for the internal combustion engine during its operating history, by the control unit to a learning unit. Additional process steps also include receiving operating parameter map update data by the control unit from the learning unit and updating the stored operating parameter map accordingly by means of the received operating parameter map update data by the control unit.

Advantages and advantageous embodiments of the method correspond here to advantages and advantageous embodiments of the engine control unit.

A final aspect relates to a method of operating a learning unit of an engine control system comprising the learning unit and an engine control unit of an internal combustion engine of a vehicle according to any one of the aforementioned embodiments. One process step is for the learning unit to receive an operating parameter history from the engine control unit, which comprises operating parameter values set for the internal combustion engine during its operating history. Further process steps are the generation of operating parameter map update data by means of a simulation model by the learning unit and the provision of the operating parameter map update data to the engine control unit by the learning unit.

Again, advantages and advantageous embodiments of the method correspond to the advantageous embodiments described for the learning unit of the engine control unit or engine control system.

The features and combinations of features, previously listed in the description, and in the introductory part, and the features and combinations of features subsequently mentioned in the description of the figure and/or only shown in the figure are applicable, not only in the respectively indicated combination, but also in other combinations, without leaving the scope of the invention. Thus, embodiments of the invention are also to be considered as comprised and disclosed, which are not explicitly shown or explained in the figure; however, arise and are producible by separate combinations of features or from the explained embodiments. Embodiments and combinations of features are also to be considered disclosed that thus do not have all features expressly disclosed anywhere in the application.

The subject according to the invention is to be explained in more detail with the aid of the schematic drawings shown in the figure, without wishing to restrict it to the specific embodiments shown here.

The figure shows a schematic representation of an exemplary embodiment of an engine control unit for an internal combustion engine of a vehicle with an associated learning unit, which together form an exemplary engine control system.

The engine control unit 1 for the internal combustion engine 2 of the vehicle not shown has a control unit 3. This control unit 3 is designed to set one or more operating parameters 4, such as an injection fuel amount F of the internal combustion engine 2, based on a predefined multidimensional operating parameter map 5 stored in the control unit 3. The multidimensional operating parameter map 5 specifies respective operating parameter values 4, such as the injection fuel amount F in this case, for various operating states 6, such as a pressure P and a temperature T of the internal combustion engine 2. In this context, the operating states 6 can be provided by the internal combustion engine 2 and corresponding combustion engine sensors and/or by further or additional sensors 7 in an environment of the combustion engine 2.

The control unit 3 is designed to transmit an operating parameter history **4*t* to the learning unit 8. The operating parameter history 4*t* and the operating parameter map update data 5 are transmitted via a corresponding wireless connection 11, which is implemented via corresponding wireless interfaces of control unit 3 and learning unit 4. The operating parameter history 4*t* comprises operating parameter values set for the internal combustion engine 2 during its operating history, in this case in the form of the time-dependent injection fuel amount F(t). The control unit 3 is also designed to receive operating parameter map update data 5' from the learning unit 8, which in the example shown comprises a new, updated operating parameter map, and to update the stored operating parameter map 5 by means of the operating parameter map update data 5', in this case to replace the stored operating parameter map 5 with the new operating parameter map 5'**.

In the example shown, a simulation model 9 of the internal combustion engine 2 and a target function for evaluating the behavior of the internal combustion engine 2 are stored in the learning unit 8. In this case, the simulation model 9 can be trained by means of a learning algorithm 10 stored in the learning unit 8, and the learning unit 8 is designed to update the simulation model 9 based on the transmitted operating parameter history 4*t* and the stored target function by means of the learning algorithm' 10 and to generate the operating parameter map update data 5' in turn by means of the updated simulation model 9. The learning unit 8 is further designed to provide the operating parameter map update data 5', in this case the new operating parameter map, to the engine control unit 1 or the control unit 3.

Thus, in the example shown, by repeatedly providing the operating parameter history 4*t*, the simulation model 9 is iteratively improved and adapted to the real operating conditions of the internal combustion engine 2. As a result, the operating parameter map 5 stored in the control unit 3 is continuously improved and the engine control of the internal combustion engine 2 is optimized.

In the present case, the learning unit 8 is arranged locally remote from the engine control unit 1, for example in a server device, preferably in a cloud, so that the learning algorithm 10 can be executed particularly quickly and updated easily. Engine control unit 1 and learning unit 8 thus form a motor control system 17.

The invention claimed is:

1. An engine control system comprising an engine control unit for an internal combustion engine of a vehicle and a learning unit, wherein the learning unit is integrated into the engine control unit or wherein the learning unit is an external learning unit, wherein the control unit is designed to set one or more operating parameters of the internal combustion engine based on a predefined multidimensional operating parameter map which is stored in the control unit and specifies respective operating parameter values for various operating states of the internal combustion engine, wherein the control unit is designed to transmit an operating parameter history, which comprises operating parameter values set for the internal combustion engine in its operating history, to a learning unit, and to receive operating parameter map update data from the learning unit and to update the stored operating parameter map by the operating parameter map update data; and wherein a simulation model of the internal combustion engine and a target function for evaluating the behavior of the internal combustion engine is stored in the learning unit, wherein the simulation model is trainable by a learning algorithm stored in the learning unit, and the learning unit is designed (i) to update the simulation model based on the transmitted operating parameter history and the stored target function by utilizing the learning algorithm;

(ii) to generate the operating parameter map update data by the updated simulation model; or (iii) to provide the operating parameter map update data to the control unit for updating the operating parameter map stored in the control unit.

2. The engine control system according to claim 1, wherein the respective operating state of the internal combustion engine is represented by operating state data and/or the respective operating parameters, which are set by the control unit, comprise a throttle valve position and/or a fuel injection amount and/or an ignition timing and/or a valve opening time and valve closing time.

3. The engine control system according to claim 2, wherein the operating state data comprises an engine rpm and/or a throttle valve position and/or a fuel injection amount and/or a residual combustion gas amount and/or an ignition timing and/or a valve opening time and valve closing time and/or an engine temperature and/or an intake-side gas mixture pressure and/or a pressure in the combustion chamber and/or an exhaust-side gas mixture pressure and/or an engine torque and/or an engine mileage, and/or a geographic position of the vehicle and/or an engine ambient air pressure and/or an engine ambient humidity and/or an engine ambient temperature and/or a fuel quality and/or an internal combustion engine type designation and/or a vehicle type designation and/or a vehicle mass.

4. The engine control system according to claim 1, wherein the operating parameter history further comprises the operating states of the internal combustion engine on the basis of which the respective operating parameter values are set.

5. The engine control system according to claim 1, wherein the operating parameter history further comprises a chronological sequence of the operating states of the internal combustion engine and of the set operating parameter values corresponding to the respective operating states.

6. The engine control system according to claim 1, wherein the learning unit is designed to repeatedly perform the updating according to (i), the generating according to (ii), and the providing according to (iii).

7. The engine control system according to claim 1, which is designed to generate the operating parameter map update data by the updated simulation model by a new operating parameter map calculated using the updated simulation model, the operating parameter map update data then being suitable for aligning the operating parameter map stored in the control unit with the new operating parameter map.

8. The engine control system according to claim 1, wherein the target function evaluates the behavior of the internal combustion engine based on a predetermined optimization parameter.

9. The engine control system according to claim 8, wherein the predetermined optimization parameter comprises a torque response of the internal combustion engine, a fuel consumption of the internal combustion engine, and/or an exhaust gas composition of the internal combustion engine.

10. The engine control system according to claim 1, wherein the control unit is designed to transmit the operating parameter history and/or to receive the operating parameter map update data only in a predetermined time period and/or only in a predetermined local area and/or only in a predetermined operating state of the internal combustion engine.

11. An engine control system according to claim 1, wherein the learning unit is disposed remotely from the engine control unit in a server device.

12. The engine control system according to claim 11, wherein the transmission of the operating parameter history and/or the reception of the operating parameter map update data is performed via a wireless interface of the control unit and the learning unit.

13. The engine control system according to claim 12, wherein the wireless interface is a mobile radio interface and/or a wireless local area network interface and/or a near-field radio interface.

14. An internal combustion engine or vehicle comprising an engine control unit of an engine control system according to claim 1.

15. A method for operating an engine control system of an internal combustion engine of a vehicle, comprising:

setting, based on a predefined multidimensional operating parameter map which specifies respective operating parameter values for various operating states of the internal combustion engine, one or more operational parameters of the internal combustion engine by the control unit;

transmitting an operating parameter history, which comprises operating parameter values set for the internal combustion engine in its operating history, by the control unit to a learning unit;

receiving operating parameter map update data by the control unit from the learning unit; and updating the stored operating parameter map by means of the received operating parameter map update data, by the control unit, wherein a simulation model of the internal combustion engine and a target function for evaluating the behavior of the internal combustion engine are stored in the learning unit, wherein the simulation model is trainable by a learning algorithm stored in the learning unit, and the learning unit is designed (i) to update the simulation model based on the transmitted operating parameter history and the stored target function by utilizing the learning algorithm;

(ii) to generate the operating parameter map update data by the updated simulation model; or (iii) to provide the operating parameter map update data to the control unit for updating the operating parameter map stored in the control unit.

16. A method for operating a learning unit of an engine control system comprising the learning unit and an engine control unit of an internal combustion engine of a vehicle, comprising:

receiving an operating parameter history, which comprises operating parameter values set for the internal combustion engine in its operating history, by the learning unit from the engine control unit;

generating operating parameter map update data using a simulation model of the internal combustion engine by the learning unit; and providing the operating parameter map update data to the engine control unit by the learning unit, wherein the simulation model of the internal combustion engine and a target function for evaluating the behavior of the internal combustion engine is stored in the learning unit. wherein the simulation model is trainable by a learning algorithm stored in the learning unit, and the learning unit is designed (i) to update the simulation model based on the transmitted operating parameter history and the stored target function by utilizing the learning algorithm;

(ii) to generate the operating parameter map update data by the updated simulation model; or (iii) to provide the operating parameter map update data to the control unit for updating the operating parameter map stored in the control unit.

* * * * *